3,819,645
V-TRIAZOLYLCOUMARINS

Rudolf Kirchmayr, Binningen, Basel-Land, Switzerland, assignor to Ciba-Geigy Corporation, Ardsley, N.Y.
No Drawing. Continuation of abandoned application Ser. No. 69,149, Sept. 2, 1970. This application Mar. 5, 1973, Ser. No. 337,781
Int. Cl. C07d 99/04; C09k 1/02
U.S. Cl. 260—308 B            2 Claims

ABSTRACT OF THE DISCLOSURE

New 3-phenyl-7-v-triazolylcoumarins are optical brighteners of organic materials. They are prepared by condensing oxime hydrazones which are produced by reacting 1,1-dialkyl-2-oximino-indan-3-ones and 3-phenyl-7-hydrazinocoumarins.

This is a continuation of application Ser. No. 69,149, filed Sept. 2, 1970, and now abandoned.

DETAILED DESCRIPTION

The present invention relates to new coumarins substituted in the 3-position by a mononuclear, aromatic carbo- or heterocyclic group, which coumarins contain in the 7-position a v-triazolyl group to which, in the 4,5-position, a 1,1-dialkylindane radical is annularly-linked. The invention also relates to the use of these compounds for the optical brightening of organic materials such as polyesters, to the material brightened with these compounds, as well as to a process for the production of the compounds.

3-Phenylcoumarins containing in the 7-position a v-triazolyl-(2)-group which is substituted with a tetramethylene group or with an o,ω-phenylmethylene group or -ethylene group, are already known as optical brighteners. They have negligible inherent colour, exhibit in daylight an intense blue-violet to violet fluorescence, and have a better fastness to light than other known brighteners of similar structure.

It has now been found in the further development of this invention that v-triazolylcoumarins of formula

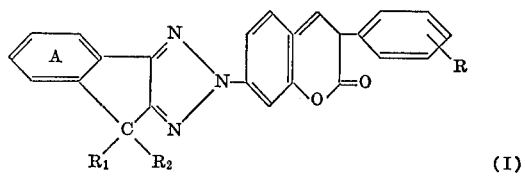

wherein $R_1$ and $R_2$ represent alkyl groups having 1 to 6 carbon atoms, and
Y represents a mononuclear carbo- or heterocyclic aryl group which is in conjugation with the coumarin ring, and the coumarin radical, as well as the benzene nucleus A, can be further substituted by halogen, lower alkyl and alkoxy groups, constitute a class having a surprisingly good and brilliant brightening effect, whereby, at the same time, the fastness to light is appreciably greater than that of the stated known compounds. Since the new compounds are moreover more difficulty volatile, they are particularly suitable for the brightening of organic materials exposed to elevated temperatures such as, e.g. spinning masses.

v-Triazoles according to the invention constitute colourless to yellowish crystalline substances. An intense blue to violet fluoroescence is exhibited by ionogenically substituted products dissolved in water or in polar organic solvents, and by compounds without ionogenic groups dissolved in organic solvents. In small amounts, the new coumarin compounds impart to yellowed organic material into which they have been incorporated by the usual methods, or on to which they have been applied by the usual methods, a pure white appearance in daylight, and are therefore valuable optical brighteners.

Especially valuable are compounds wherein Y represents a phenyl group optionally substituted by halogen such as fluorine, chlorine or bromine, or by an alkyl group having 1–4 carbon atoms, particularly compounds of formula I

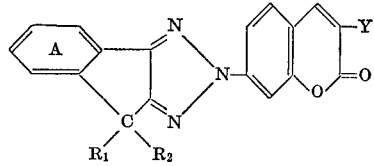

wherein $R_1$ and $R_2$ represent alkyl groups having 1 to 6 carbon atoms, especially methyl groups, and
R represents hydrogen, halogen or an alkyl group having 1 to 4 carbon atoms, and the benzene nucleus A can be substituted by halogen or alkyl groups having 1 to 4 carbon atoms, preferably such compounds wherein A is unsubstituted or substituted by chlorine or the methyl group, and R denotes hydrogen, chlorine or the methyl group.

If $R_1$, $R_2$, R or the substituents of A are alkyl, they can be, for example, methyl, ethyl, propyl, iso-propyl, butyl or tert-butyl and $R_1$ and $R_2$ can also be pentyl or hexyl.

The mononuclear, carbo- or heterocyclic aryl group Y is preferably the phenyl group.

The compounds are used for the optical brightening of organic materials. Depending on the substituents, they are particularly suitable for specific substrates. They are used for the optical brightening of high molecular, hydrophobic organic material, especially for the brightening of synthetic organic polyplasts, particularly in the spinning mass, i.e. synthetic materials obtainable by polymerisation, e.g. polycondensation or polyaddition, such as polyolefins, e.g. polyethylene or polypropylene, also for the brightening of polyvinyl chloride, in particular, however, polyesters, especially polyesters of aromatic polycarboxylic acids with polyvalent alcohols such as polyterephthalic acid glycol esters, synthetic polyamides such as Nylon-6 and Nylon-66, but also cellulose esters such as cellulose acetates.

The optical brightening of the high-molecular, hydrophobic organic material is performed, e.g. by incorporating into this small amounts of optical brighteners according to the invention, preferably 0.001 to 1% relative to the material to be brightened, optionally together with other substances such as softeners, stabilizers or pigments. The brighteners may be incorporated into the synthetic materials, e.g. dissolved in softeners such as dioctylphthalate, or together with stabilisers such as dibutyl tin dilaurate or sodium pentaoctyltripolyphosphate, or together with pigments such as, e.g. titanium dioxide. Depending on the type of material to be brightened, the brightener may also be dissolved in the monomers before polymerisation, in the polymer mass, or together with the polymer in a solvent. The thus pre-treated material is then brought into the desired ultimate form by processes known per se such as calendering, pressing, extrusion, coating, moulding and, in particular, by spinning and stretching. The brighteners can also be worked into finishings e.g. into finishings for textile fibres such as polyvinyl alcohol, or into resins or resin precondensates such as, e.g. methylol compounds of ethylene urea, which are used for the treatment of textiles.

High-molecular organic material can also be brightened in the form of fibres. For the brightening of these fibre materials it is advantageous to use an aqueous dispersion of v-triazoles of formula I according to the invention. The brightener dispersion hereby preferably has a content of 0.005–0.5% of v-triazole according to the invention, relative to the fibre material. In addition, the dispersion may contain auxiliaries such as dispersing agents, e.g. condensation products of fatty alcohols or alkylphenols containing 10 to 18 carbon atoms, with 15 to 25 moles of ethylene oxide, or condensation products of alkylmono- or polyamines containing 16 to 18 carbon atoms, with at least 10 moles of ethylene oxide, organic acids such as formic, oxalic or acetic acid, detergents, swelling agents such as di- or trichlorobenzenes, wetting agents such as sulphosuccinic acid alkyl ester, bleaching agents such as sodium chlorite, peroxides or hydrosulphites, as well as, optionally, brightening agents of other classes such as, e.g. stilbene derivatives having affinity to cellulose.

The brightening of the fibre material with the aqueous brightener dispersion is performed either in the exhaust process, at temperatures of preferably 30 to 150° C., or in the padding process. In the latter case, the material is impregnated, e.g. with a 0.2–0.5% brightener dispersion, and then finished, e.g. by a dry or moist heat treatment, e.g. by steaming at 2 atm., or, after drying, by a short dry heating to 180–220°, whereby, optionally, the fabric is simultaneously thermofixed. The fibre material treated in this manner is finally rinsed and dried.

High-molecular organic material optically brightened according to the invention, particularly synthetic fibre material brightened in the exhaust process, has a pleasing, pure white, blue-violet to bluish fluorescent appearance.

The new brighteners can be produced according to the invention by reacting in weakly acid medium an oxime of formula

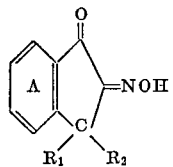

with a coumarinyl hydrazine of formula

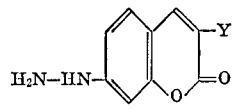

to the corresponding oxime hydrazone; and converting this with the aid of a condensation agent into a compound of formula I. In the formulae, $R_1$ and $R_2$ represent alkyl groups having 1 to 6 carbon atoms, Y represents a mononuclear carbo- or heterocyclic aryl group which is in conjugation with the coumarin ring. The benzene nucleus A as well as the coumarin ring can be further substituted by halogen, lower alkyl and/or alkoxy groups.

It is advantageous to operate in the first stage in acetic acid medium at elevated temperature. Used as condensation agents in the second stage are protonic acids or acid anhydrides, the condensation being performed with the exclusion of water and, optionally, with heating.

Suitable ring-closing protonic acids are in the first place, e.g. hydrohalic acids; effective acid anhydrides are, e.g. the inorganic anhydrides: phosphorus pentoxide, and sulphur trioxide, the mixed inorganic-organic anhydrides such as alkanoyl and aroyl, alkylsulphonyl and arylsulphonyl halides, e.g. acetyl chloride, benzoyl chloride, toluene sulphochloride, as well as the purely organic anhydrides such as acetic anhydride, benzoic acid anhydride, also the mixed anhydride of formic acid and acetic acid.

Condensation can be performed in the presence of organic solvents which are inert under the reaction conditions. Suitable as such are high-boiling hydrocarbons and halogenated hydrocarbons, e.g. chlorobenzene, dichlorobenzenes, xylenes. It is also possible to use inert, slightly or more strongly basic solvents, e.g. dimethylformamide, dimethylacetamide or pyridine, picolines, quinolines. Depending on the substituents of the oxime hydrazones, the ring closure can be effected by simply allowing the reaction mixture to stand, or by it being heated. Suitable reaction temperatures are those between room temperature and 250° C., preferably 200° C. Favourable results with regard to yields and purity of the final products are produced sometimes by the presence of basic catalysts such as anhydrous alkali metal salts or alkaline-earth metal salts of organic acids, e.g. sodium or potassium acetate.

As a modification of the described production process, the firstly formed oxime hydrazone can be converted with an oxidising agent into a v-triazole oxide of formula

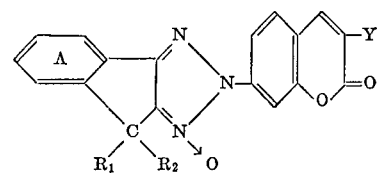

and this then reduced with nascent hydrogen to a compound of formula I.

Oxidative ring closure can be effected by the action of the most divers oxidising agents, whereby it is advisable to thereby operate in solvents resistant to oxidation. In acid solution, e.g. acetic acid solution, bischromate or hydrogen peroxide are suitable oxidising agents; in basic solvents, such as pyridine or pyridine/water mixtures, potassium ferricyanide is, for example, suitable.

The generally applicable and therefore preferred process consists in oxidation with copper-(II)-sulphate in pyridine-water. It is not necessary thereby for stoichiometric amounts of copper to be used, since the monovalent copper formed during the reaction can be continually converted in the course of the reaction, by the blowing in of air or oxygen, again into the bivalent stage.

For the reduction of triazole oxides to triazoles using known methods, the reduction with base metals and acids, such as zinc dust in acetic acid or in acetic acid/water mixtures, is advantageously chosen. It is also possible to use for the reduction, however, salts of reducing acids of sulphur or phosphorus.

The oxime of formula III used as starting material can be produced in a known manner by condensation of a β,β-dialkylacrylic acid with a benzene using $AlCl_3$ as the condensation agent, and subsequent oximation of the formed indanone.

The temperatures are given in degrees Centigrade in the following examples.

EXAMPLE 1

A solution of 30.0 g. of 1,1-dimethyl-2-oximinoindan-3-one and 50.0 g. of phenyl-7-hydrazinocoumarin in 350 ml. of ethylene glycol monomethyl ether is acidified with 120 ml. of 50% acetic acid, and stirred for 12 hours at 60–70°, whereby α-oximinohydrazone crystallises out in the form of red-brown crystals. After all the 3-phenyl-7-hydrazinocoumarin is consumed, the condensation product is filtered off under suction, washed with alcohol, and dried.

An amount of 20.0 g. of the thus obtained α-oximinohydrazone is refluxed with 20.0 g. of anhydrous potassium acetate in 200 ml. of acetic acid anhydride for 5 hours. The crystal mass precipitating on cooling of the reaction mixture is filtered off under suction, washed with ethyl alcohol, hot water, and again with ethyl alcohol. By recrystallisation from toluene and from methyl ethyl ketone is obtained the brightener of the following formula:

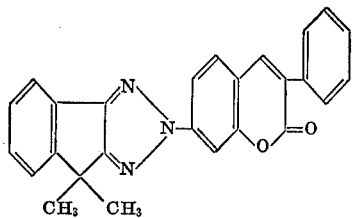

(M.P. 195°) in the form of light-yellow crystals which dissolve in chlorobenzene with an intense blue-violet fluorescence. The compound is able to brilliantly brighten organic material such as polyester fibres.

If 3-phenyl-7-hydrazinocoumarin is replaced by the equivalent amount of 3-(4-methylphenyl)-7-hydrazinocoumarin or 3-(4-chlorophenyl)-7-hydrazinocoumarin, the following brighteners are prepared in the same manner:

| | | M.P. °C. |
|---|---|---|
| 1.2 | —CH₃ structure | 231–232 |
| 1.3 | —Cl structure | 217–219 |

EXAMPLE 2

A ca. 0.1% dispersion is produced of the optical brightener according to Example 1 by diluting 10 g. of a 10% sand milling with 1000 ml. of water, and adding 2 g. of di-n-octyl sodium sulphosuccinate. A polyester fabric is padded at 20° with this dispersion (squeezing effect 50–60%, roller pressure 30 kg./cm.², speed 3 m./min.). The fabric is dried for 20 minutes at 60°.

The dry fabric is subsequently fixed for 30 seconds at 200°.

The thus treated fabric exhibits a clear brightened effect.

EXAMPLE 3

To 80 ml. of water are added 0.2 g. of di-n-octyl sodium sulphosuccinate and 0.2 g. of alkylpolyglycol ether.

A solution is prepared of the optical brightener according to Example 1 by dissolving 10 g. of the brightener in 1000 ml. of dimethylformamide=stock solution I.

A solution is produced of the optical brightener of the formula

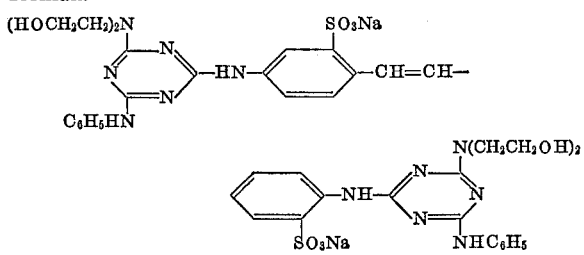

by dissolving 20 g. in 1000 ml. of water=stock solution II.

To the initially described solution are added 10 ml. of each of the stock solutions I and II. A pre-bleached polyester cotton fabric is padded with this dispersion (67:33 parts mixed, squeezing effect 50–60%, roller pressure 30 kg./cm.², speed 3 m./min.).

The fabric is dried for 20 minutes at 60°. The dry fabric is subsequently fixed for 30 seconds at 200°. The thus treated fabric exhibits a clear brightened effect.

A fabric made from 50 parts of polyester and 50 parts of cotton is brightened in the same manner.

EXAMPLE 4

To 290 ml. of water are added 0.3 ml. of alkylpolyglycol ether and 0.15 ml. of trichlorobenzene as carrier. A solution is prepared of the optical brightener according to Example 1 by dissolving 1 g. of the brightener in 1000 ml. of ethylene glycol monomethyl ether. An amount of 4.5 ml. of this stock solution is added to the above described solution. This aqueous dispersion containing the brightener is heated to 60°; to the solution are then added 15 g. of polyester fabric. The temperature is raised within 15–20 minutes to 130° and maintained there for 30 minutes; the bath is then cooled in the course of 10–15 minutes to 60°. The fabric is afterwards rinsed for 2 minutes in cold running water, and dried for 20 minutes at 60°. The dry fabric is subsequently thermofixed for 30 seconds at 200°.

The thus treated fabric exhibits a clear brightened effect.

EXAMPLE 5

1000 parts of polyester granulate made from polyterephthalic acid ethylene glycol are intimately mixed with 0.25 parts of the optical brightener according to Example 1; the mixture is then spun under nitrogen from an extruder at a temperature of 265–285°, in a known manner, through a spinning nozzle to form threads. The thus obtained polyester threads are beautifully brightened.

EXAMPLE 6

In a high-grade alloy steel autoclave provided with a stirrer, a gas-inlet tube, a vacuum arrangement, a descending condenser and a heating jacket, 388 g. of benzene-1,4-dicarboxylic acid dimethyl ester, 300 g. of 1,2-ethanediol and 0.4 g. of antimonous oxide are heated, whilst pure nitrogen is being blown through, to 200° external temperature, and this temperature is maintained for 3 hours, whereby methanol slowly distills off. With the exclusion of air, 0.4 g. of the optical brightener according to Example 1, dissolved in 40 g. of 1,2-ethanediol, are carefully fed into the autoclave, after the temperature has been allowed to fall to 190°. After the addition is completed, the temperature is raised within one hour to 285° external temperature, whereby 1,2-ethanediol distills off. The autoclave is then put under vacuum, the pressure slowly reduced to 0.2 torr, and condensation completed during three hours under these conditions. Vigorous stirring is maintained during these operations. The liquid condensation polymer is then extruded with nitrogen through the nozzle in the base. From the thus obtained polymer it is possible to produce monofilaments having a brilliant white appearance.

EXAMPLE 7

An amount of 2 g. of the optical brightener according to Example 1 is dissolved in 40 ml. of N-methylpyrrolidine; and the solution is then poured into 960 ml. of tetrachloroethylene. A polyester fabric is padded with this solution at 20°; the fabric is then squeezed out at a speed of 10 m./min., between rollers with a pressure of 30 kg./cm.², to the extent of 80% relative to the weight of the material. The padded material is dried for 1 minute at 60°, and afterwards thermofixed for 30 seconds at 200°.

The thus treated polyester material has a high and brilliant degree of whiteness.
What I claim is:
1. A compound of the formula
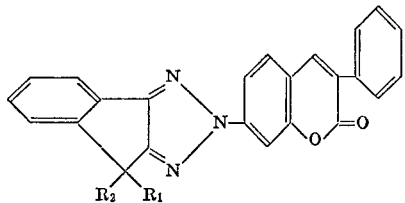
wherein $R_1$ and $R_2$ represent alkyl groups having 1 to 6 carbon atoms.
2. Coumarin compound according to claim 1 which is
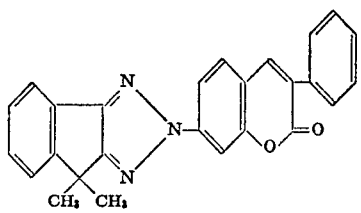
References Cited
FOREIGN PATENTS
1,572,237   5/1969   France _____ 260—308 A
ALTON D. ROLLINS, Primary Examiner
U.S. Cl. X.R.
252—301.2 W; 260—343.5, 566 A